April 6, 1965   S. S. PRESSMAN   3,177,410
TIME DELAY MERCURY PLUNGER RELAY
Filed May 28, 1962
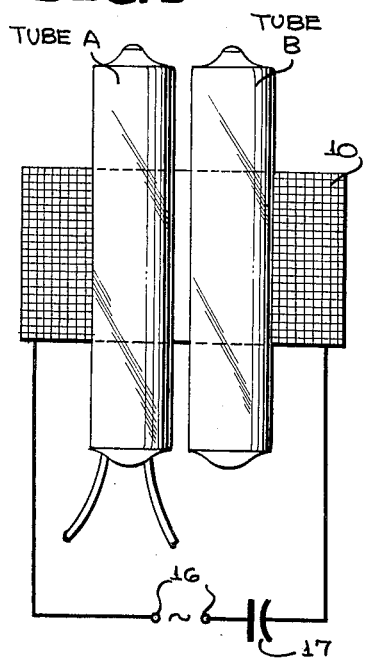
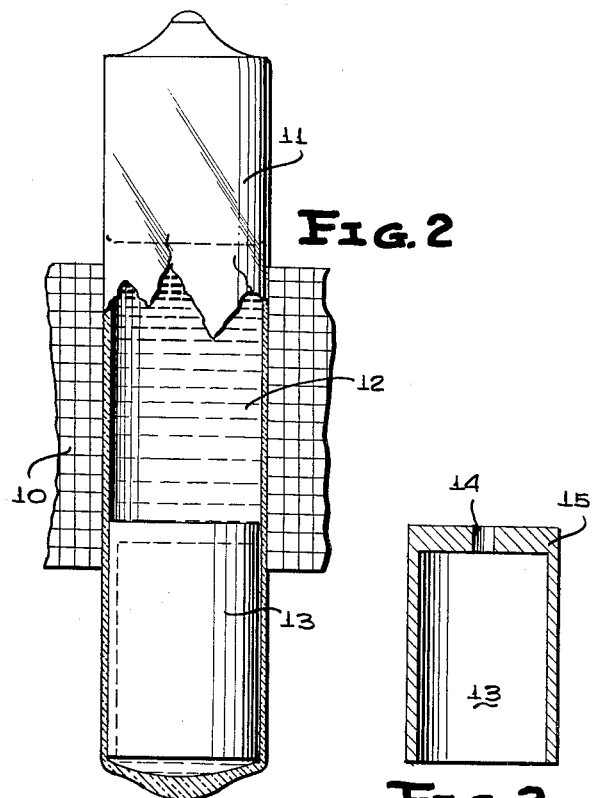
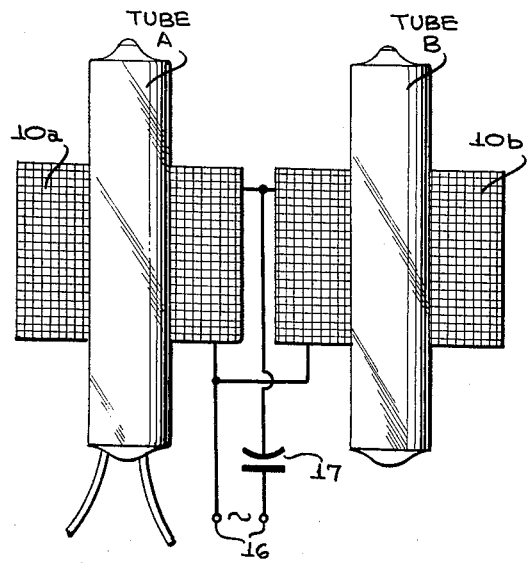
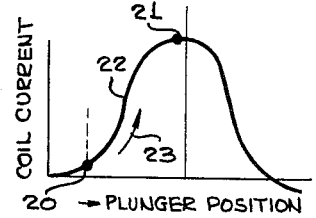
INVENTOR
SIDNEY S. PRESSMAN
BY *Hurvitz & Rose*
ATTORNEYS

United States Patent Office 3,177,410
Patented Apr. 6, 1965

3,177,410
TIME DELAY MERCURY PLUNGER RELAY
Sidney S. Pressman, Flushing, N.Y., assignor to Ebert Electronics Corporation, Queens Village, N.Y., a corporation of New York
Filed May 28, 1962, Ser. No. 198,334
3 Claims. (Cl. 317—147)

The present invention relates generally to relays, and more particularly to mercury plunger relay circuits having slow but accelerating make, and fast break, characteristics.

Briefly describing a preferred embodiment of the invention, a conventional mercury plunger relay and a magnetic plunger delay device are placed within the field of a common field coil (or within the fields of commonly energized field coils). The delay device includes a magnetic plunger, having a metering orifice, located in an oil filled non-magnetic tube. A tuning condenser is connected in series with the coil or coils and a source of A.C. current. In the unactuated condition of the magnetic plunger, it is partially outside the field of its field coil, as is also the displacement plunger of the mercury relay tube. In this condition the circuit is detuned, because of the small quantity of magnetic material within the field.

When voltage is applied to the coil or coils via the condenser, only a small current flows, whereby the magnetic plunger is slowly pulled into the coil, under control of the viscosity of the oil in relation to the size of the metering orifice. As the magnetic plunger moves into the coil inductive reactance increases at an accelerating rate, and the circuit approaches toward resonance, at an accelerated rate. Resonance or near resonance occurs when the plunger is fully inserted. Maximum plunger velocity occurs as the magnetic plunger completes its movement into the center of the field coil, and is accompanied by application of maximum voltage to the coil or coils.

The mercury displacement plunger is actuated in response to current in its field coil, which may be the field coil of the mercury plunger or a separate field coil connected in parallel. Its displacement plunger therefore undergoes an accelerated motion similar to that of the magnetic plunger, and has maximum velocity as the stroke nears completion. This serves to minimize any need for derating of the relay contacts, since the final rapid motion of the mercury plunger quickly bridges the mercury pool contacts and eliminates the sustained arcing associated with a steadily moving delayed plunger action.

It is, accordingly, a broad object of the invention to provide a novel device for generating a voltage or current wave of accelerating amplitude.

It is another object of the invention to provide a novel relay system, of the mercury plunger type, having slowing accelerated make characteristics.

A further object of the invention resides in the provision of a device connected in circuit with a mercury plunger relay for modifying the delay characteristics of the latter.

Another object of the invention is to provide a system for controllably accelerating the motion of a mercury displacement plunger in a relay, to provide maximum velocity near the termination of its movement.

The above and still further objects, features and advantages of the present invention will become apparent upon consideration of the following detailed description of one specific embodiment thereof, especially when taken in conjunction with the accompanying drawings, wherein:

FIGURE 1 is a view in front elevation of a system according to the invention;

FIGURE 2 is a magnetic delay tube employed in the system of FIGURE 1;

FIGURE 3 is an enlarged view in section of a plunger of FIGURE 2;

FIGURE 4 is a plot of the resonance characteristics of the system of FIGURE 1; and FIGURE 5 illustrates a modification of the system of FIGURE 1.

Referring now to the drawings, reference numeral 10 denotes an operating or field coil for a mercury plunger relay tube A and an oil filled magnetic plunger delay tube B. The tube A may be any commercial mercury plunger relay, which makes on energization of coil 10, preferably with delay, and normally involves a pair of contacts which are bridged by mercury on actuation of a magnetic plunger to a limiting position, in response to energization of coil 10. Coil B may include a non-magnetic sealed envelope 11, containing a quantity of oil 12, within which lies a hollow inverted cup-shaped magnetic plunger 13, having a metering orifice 14 in its top wall 15. A major part of the plunger 13 lies outside the limits of the coil 10 and the plunger 13 is sufficiently heavy to be non-floating.

The field coil 10 is connected to A.C. terminals 16 through a capacitor 17. The inductive reactance of the coil 10 with plunger 13 in withdrawn condition is so small in relation to the capacitive reactance of capacitor 17, that the circuit is far off resonance at operating frequency. For example, capacitive reactance may be three times inductive reactance.

On circuit energization the magnetic plunger 13 is gradually drawn into field coil 10, which continuously increases the inductive reactance of the field coil and hence the proximity of the circuit to resonance. As the circuit approaches resonance, field coil current increases, so that velocity of the plunger 13 increases, or its movement accelerates. The system attains resonance or near resonance when the magnetic plunger 13 is fully drawn into field coil 10.

Referring to FIGURE 4, field coil current may increase from a value 20 when the energizing circuit for field coil 10 is initially closed, to 21 at the end of a stroke of the plunger 13, the increase following the resonance curve 22 in the direction of arrow 23.

Since the plungers of both tube A and tube B are actuated by the same field coil, it follows that the plunger of tube A is drawn up with a variation of velocity roughly paralleling that of plunger 13, and hence attains maximum velocity near the termination of its stroke. It is at this point that circuit closure is accomplished. The sudden or rapid closure limits or avoids arcing, which occurs in delayed action mercury relays which rely entirely, to obtain delay, on metering of the plunger movement of the relay, since in such relays plunger movement is fairly uniform.

In FIGURE 5 the tubes A and B are provided with separate field coils 10a and 10b, which are connected in parallel across terminals 16, and both in series with capacitor 17. The system of FIGURE 5 operates like that of FIGURE 1, i.e. initially operation takes place at point 20 of FIGURE 4, and finally at point 21, but the resonant circuit design takes account of the reactive inductance of both coils. Series connection of the coils is also feasible, but with decreased effectiveness due to division of voltage across the two coils, whereas the parallel arrangement maximizes current to the coils.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a circuit for providing a predetermined delay time in actuation of a mercury relay having a movable displacer to vary the level of a mercury pool for closing or opening electrical contacts therein; means for controlling the speed of actuation of said displacer, said controlling means including a non-magnetic sealed tube, a pool of viscous fluid in said tube, a magnetic plunger movable in said viscous fluid, a metering orifice in said plunger to control the rate of flow of viscous fluid therethrough as said plunger is moved in said fluid and thereby to control the speed of movement of said plunger; inductive coil means surrounding portions of said relay and said tube for actuating said displacer and said plunger in response to A.C. current flow therethrough; capacitance means connected to said inductive coil means in series resonant circuit; said plunger being movable inwardly and outwardly of said coil means; said series resonant circuit being tuned to resonance at the frequency of said A.C. current in response to said plunger assuming a preselected position inwardly of said coil means and being progressively detuned from resonance as said plunger is progressively displaced from said preselected position; the speed at which said plunger moves within said pool of viscous fluid being a function of the magnitude of said current flow and the rate of flow of said viscous fluid through said metering orifice, whereby movement of said plunger varies the tuning of said resonant circuit and the magnitude of current flowing through said coil means to proportionally vary the speed of movement of said displacer.

2. The combination according to claim 1 wherein said inductive coil means comprises a single field coil.

3. The combination according to claim 1 wherein said inductive coil means comprises a pair of separate field coils connected in parallel circuit, said capacitance means being connected in series resonant circuit with said parallel circuit.

References Cited by the Examiner
UNITED STATES PATENTS

| | | | |
|---|---|---|---|
| 2,081,367 | 5/37 | Nicolson | 317—147 |
| 2,208,271 | 7/40 | Hedin et al. | 317—141 |
| 2,597,559 | 5/52 | Bekey | 317—123 |
| 2,960,638 | 11/60 | Petrie | 317—141 |
| 3,155,437 | 11/64 | Kinsey et al. | 317—123 X |

SAMUEL BERNSTEIN, *Primary Examiner.*